(12) United States Patent
Kuo et al.

(10) Patent No.: US 9,075,925 B2
(45) Date of Patent: *Jul. 7, 2015

(54) SERIAL PERIPHERAL INTERFACE AND METHOD FOR DATA TRANSMISSION

(71) Applicant: Macronix International Co., Ltd., Hsinchu (TW)

(72) Inventors: Yu-Lan Kuo, Hsinchu (TW); Chun-Hsiung Hung, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/687,586

(22) Filed: Nov. 28, 2012

(65) Prior Publication Data

US 2013/0086294 A1    Apr. 4, 2013

Related U.S. Application Data

(63) Continuation of application No. 13/362,801, filed on Jan. 31, 2012, now Pat. No. 8,341,324, which is a continuation of application No. 12/851,156, filed on Aug. 5, 2010, now Pat. No. 8,135,896, which is a continuation of application No. 11/896,846, filed on Sep. 6, 2007, now Pat. No. 7,788,438.

(51) Int. Cl.
  *G06F 13/14* (2006.01)
  *G06F 3/00* (2006.01)
  *G06F 5/00* (2006.01)
  *G06F 13/00* (2006.01)
  (Continued)

(52) U.S. Cl.
  CPC .............. *G06F 13/40* (2013.01); *G06F 13/385* (2013.01)

(58) Field of Classification Search
  CPC ................................ G06F 13/385; G06F 13/40
  USPC ....................... 710/3, 4, 6, 59, 100, 105, 305; 713/400–601
  See application file for complete search history.

(56) References Cited

U.S. PATENT DOCUMENTS 4,395,756 A * 7/1983 Daniels ........................... 710/59
4,808,802 A    2/1989 Kano
(Continued)

FOREIGN PATENT DOCUMENTS

CN    202907189 U  *  4/2013  .............. H04W 4/12
CN    103794244 A  *  5/2014  .............. G11C 11/56
(Continued)

OTHER PUBLICATIONS

FM25C160U 16K-Bit SPI Interface Serial CMOS EEPROM Datasheet, Feb. 2002, Fairchild Semiconductor Corporation, Rev. B, pp. 3, 6, and 7.*

(Continued)

*Primary Examiner* — Faisal M Zaman
(74) *Attorney, Agent, or Firm* — McClure, Qualey & Rodack, LLP

(57) ABSTRACT

A serial peripheral interface of an integrated circuit including multiple pins and a clock pin is provided. The pins are coupled to the integrated circuit for transmitting an instruction, an address or a read out data. The clock pin is coupled to the integrated circuit for inputting multiple timing pulses. The plurality of pins transmit the instruction, the address or the read out data at rising edges, falling edges or both edges of the timing pulses.

20 Claims, 6 Drawing Sheets

(51) Int. Cl.

| | |
|---|---|
| G06F 13/42 | (2006.01) |
| G06F 13/40 | (2006.01) |
| G06F 13/38 | (2006.01) |

(56) References Cited

U.S. PATENT DOCUMENTS

| | | | |
|---|---|---|---|
| 4,897,819 A | 1/1990 | Takizawa | |
| 5,031,209 A | 7/1991 | Thornborough et al. | |
| 5,046,180 A | 9/1991 | Ueda et al. | |
| 5,075,805 A * | 12/1991 | Peddle et al. | 360/61 |
| 5,084,814 A | 1/1992 | Vaglica et al. | |
| 5,097,118 A | 3/1992 | Iijima | |
| 5,386,539 A * | 1/1995 | Nishi | 711/115 |
| 5,515,514 A | 5/1996 | Dhuey et al. | |
| 5,579,251 A | 11/1996 | Sato | |
| 5,734,845 A * | 3/1998 | Sugahara | 710/113 |
| 5,764,081 A | 6/1998 | Fant et al. | |
| 5,787,298 A | 7/1998 | Broedner et al. | |
| 6,157,567 A | 12/2000 | Kuo et al. | |
| 6,523,099 B1 | 2/2003 | Namekawa | |
| 6,625,065 B2 | 9/2003 | Gall et al. | |
| 6,694,381 B1 | 2/2004 | Lo et al. | |
| 6,697,296 B2 | 2/2004 | Matsumoto et al. | |
| 6,711,073 B2 | 3/2004 | Martin | |
| 6,718,421 B1 | 4/2004 | Conroy | |
| 6,900,659 B2 | 5/2005 | Goldfinch | |
| 6,998,871 B2 | 2/2006 | Mulligan | |
| 7,159,069 B2 | 1/2007 | Adusumilli et al. | |
| 7,206,219 B2 | 4/2007 | Lee et al. | |
| 7,281,082 B1 | 10/2007 | Knapp | |
| 7,375,549 B1 | 5/2008 | Tang et al. | |
| 7,378,873 B1 | 5/2008 | Tang et al. | |
| 7,409,572 B1 * | 8/2008 | Hung et al. | 713/500 |
| 7,487,281 B2 | 2/2009 | Okamoto et al. | |
| 7,558,900 B2 | 7/2009 | Jigour et al. | |
| 7,568,060 B2 | 7/2009 | Daly et al. | |
| 7,620,763 B2 | 11/2009 | Bartley et al. | |
| 7,624,248 B1 | 11/2009 | Wentzlaff et al. | |
| 7,689,763 B2 | 3/2010 | Charles et al. | |
| 7,694,025 B1 | 4/2010 | Norrie | |
| 7,788,438 B2 * | 8/2010 | Kuo et al. | 710/305 |
| 8,135,896 B2 * | 3/2012 | Kuo et al. | 710/305 |
| 8,341,324 B2 * | 12/2012 | Kuo et al. | 710/305 |
| 8,407,510 B1 * | 3/2013 | Rosen | 713/500 |
| 2002/0003748 A1 * | 1/2002 | Fujita et al. | 365/233 |
| 2002/0087911 A1 * | 7/2002 | Liu | 713/600 |
| 2002/0129215 A1 * | 9/2002 | Yoo et al. | 711/167 |
| 2003/0065465 A1 * | 4/2003 | Johnson et al. | 702/89 |
| 2003/0097502 A1 | 5/2003 | Bacigalupo | |
| 2003/0110339 A1 * | 6/2003 | Calvignac et al. | 710/305 |
| 2003/0214861 A1 * | 11/2003 | Takano et al. | 365/200 |
| 2004/0003160 A1 | 1/2004 | Lee et al. | |
| 2004/0008725 A1 | 1/2004 | McNamara et al. | |
| 2004/0039866 A1 | 2/2004 | Cheung | |
| 2004/0068593 A1 | 4/2004 | Helenic et al. | |
| 2004/0078500 A1 | 4/2004 | Pezzini | |
| 2004/0143773 A1 * | 7/2004 | Chen | 713/400 |
| 2004/0236978 A1 * | 11/2004 | Yoon | 713/500 |
| 2005/0034006 A1 * | 2/2005 | Schoenfeld et al. | 713/401 |
| 2005/0190640 A1 * | 9/2005 | Braceras et al. | 365/233 |
| 2005/0289314 A1 * | 12/2005 | Adusumilli et al. | 711/168 |
| 2006/0031565 A1 * | 2/2006 | Iyer et al. | 709/234 |
| 2006/0041713 A1 | 2/2006 | Charles et al. | |
| 2006/0067123 A1 * | 3/2006 | Jigour et al. | 365/185.05 |
| 2006/0069940 A1 * | 3/2006 | Gomm | 713/401 |
| 2006/0245267 A1 | 11/2006 | Choi | |
| 2006/0265565 A1 * | 11/2006 | Choi et al. | 711/167 |
| 2007/0061646 A1 | 3/2007 | Whetsel | |
| 2007/0064725 A1 | 3/2007 | Minami et al. | |
| 2007/0079043 A1 | 4/2007 | Yu et al. | |
| 2007/0136502 A1 | 6/2007 | Wen et al. | |
| 2008/0005408 A1 | 1/2008 | Yen et al. | |
| 2008/0005434 A1 | 1/2008 | Lee et al. | |
| 2008/0059768 A1 | 3/2008 | Hung et al. | |
| 2010/0007377 A1 | 1/2010 | Hing et al. | |

FOREIGN PATENT DOCUMENTS

| | | | |
|---|---|---|---|
| EP | 865046 | 9/1998 | |
| EP | 1388790 | 2/2004 | |
| EP | 1764803 | 3/2007 | |
| EP | 2141607 | 1/2010 | |
| JP | 01088760 | 4/1989 | |
| JP | 02308492 | 12/1990 | |
| JP | 03102473 | 4/1991 | |
| JP | 04052962 | 2/1992 | |
| JP | 05094299 | 4/1993 | |
| JP | 11154395 | 6/1999 | |
| JP | 11305923 | 11/1999 | |
| JP | 2000311224 | 11/2000 | |
| JP | 2002109882 | 4/2002 | |
| JP | 2005027205 | 1/2005 | |
| JP | 2006018542 | 1/2006 | |
| JP | 2006171988 | 6/2006 | |
| JP | 2008077531 | 4/2008 | |
| JP | 2010044513 | 2/2010 | |
| JP | 2012043024 A * | 3/2012 | G06F 12/16 |
| TW | 556211 | 10/2003 | |
| TW | 200632932 | 9/2006 | |

OTHER PUBLICATIONS

Weranga, K., et al.; "Smart Metering for Next Generation Energy Efficiency and Conservation;" Innovative Smart Grid Technologies—Asia (ISGT Asia), 2012 IEEE, pp. 1-8, May 21-24, 2012.

Yabin, et al.; "Design and Implementation of the Configuration Circuit for FDP FPGA;" Dec. 3, 2008, IEEE, IEEE Asian Pacific Conference on Circuits and Systems, pp. 696-700.

Melear, C.;"Intelligent Peripheral Modules for Microcontrollers;" Mar. 9, 1995, IEEE, Southcon/95 Conference Record, pp. 90-99.

Szekacs, et al.; "Realising the SPI Communication in a Multiprocessor System;" Aug. 25, 2007, IEEE, 5th International Symposium on Intelligent Systems and Informatics, pp. 213-216.

Zhang, et al.; "A Highly Programmable Sensor Network Interface with Multiple Sensor Readout Circuits;" Oct. 24, 2003, IEEE, vol. 3, Proceedings of IEEE Sensors, pp. 748-752.

Chen, et al.; "Design of RF Transceiver with CC1100 Chip for Wireless Data Acquisition;" Anit-counterfeiting, Security and Identification, 2008, ASID 2008, 2nd International Conference, pp. 158-162, Aug. 20-23, 2008.

Zhang, J., et al.; "Highly Adaptive Transducer Interface Circuit for Multiparameter Microsystems;" Circuits and Systems I; Regular Paper, IEEE Transactions, vol. 54, No. 1, pp. 167-178, Jan. 2007.

Baronti, F., et al.; "Firmware/Software Platform for Rapid Development of PC-based Data Acquisition Systems;" Electronics, Circuits, and Systems (ICECS), 2010 17th IEEE International Conference, pp. 1108-1111, Dec. 12-15, 2010.

Lucev, Z., et al.; "Multifunctional Configurable USB Data Acquisition System;" Instrumentation and Measurement Technology Conference Proceedings, 2008, IMTC 208, IEE, pp. 1206-1209, May 12-15, 2008.

\* cited by examiner

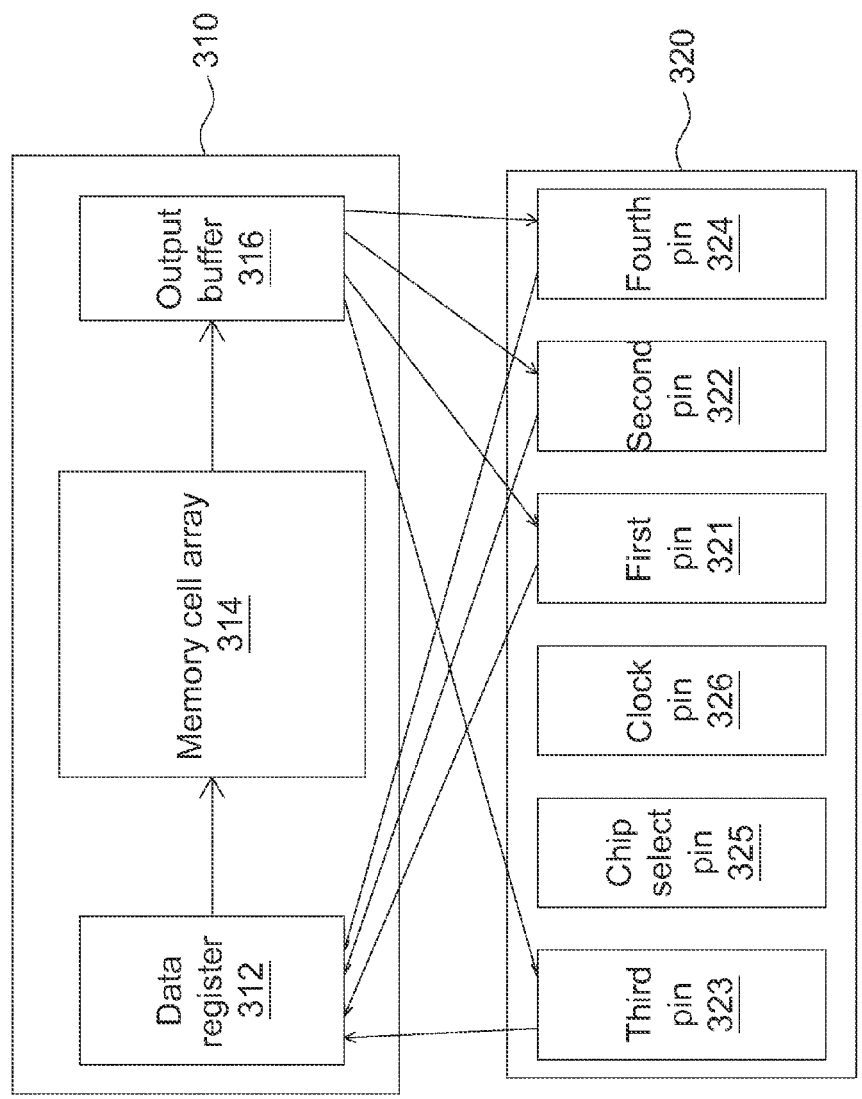

SERIAL PERIPHERAL INTERFACE AND METHOD FOR DATA TRANSMISSION

This application is a continuation application of co-pending U.S. application Ser. No. 13/362,801, filed Jan. 31, 2012, which is a continuation application of co-pending U.S. application Ser. No. 12/851,156, filed Aug. 5, 2010, which is a continuation application of co-pending U.S. application Ser. No. 11/896,846 filed Sep. 6, 2007. These related applications are incorporated herein by reference.

BACKGROUND OF THE INVENTION

1. Field of the Invention

The invention relates in general to a serial peripheral interface and a data transmitting method thereof, and more particularly to a serial peripheral interface having a better overall behavior and a data transmitting method thereof.

2. Description of the Related Art

FIG. 1 (Prior Art) is a block diagram showing a conventional data transmission system. Referring to FIG. 1, the data transmission system 100 includes an integrated circuit 110 and a serial peripheral interface 120. The serial peripheral interface 120 has many pins, for example, including an input pin 122, an output pin 124, a chip select pin 126 and a clock pin 128. The input pin 122 receives a piece of serial data, including instructions and addresses, and transmits the piece of serial data to the integrated circuit 110. The output pin 124 reads a piece of serial data, including dummy cycles and multiple read out data, from the integrated circuit 110 and outputs the piece of serial data. The chip select pin 126 provides a chip select signal CS, and the clock pin 128 provides a clock signal SCLK.

FIG. 2 (Prior Art) shows timings for reading serial data in the conventional data transmission system. As shown in FIG. 2, for example, the piece of serial data includes an 8-bit instruction, a 24-bit address, n dummy cycles and multiple 8-bit read out data, wherein n is an integer greater than or equal to 0 and is not particularly limited. It can be determined according to the design of data transmission system 100. As shown in FIG. 2, when the chip select signal CS is low, the clock signal SCLK has many timing pulses. At this time, the input pin first receives the 8-bit instruction, and then receives the 24-bit address, which is the initial address of the data to be read. Then, n dummy cycles are provided for buffering. Next, the output pin reads and outputs the multiple 8-bit read out data.

The data transmission system 100 utilizes one single input pin and one single output pin of the serial peripheral interface 120 to perform the serial data transmitting operation. Consequently, only one bit of data is transmitted in one timing pulse, and the efficiency is not high. So, the overall behavior of the data transmission system 100 cannot be optimized.

SUMMARY OF THE INVENTION

The invention is directed to a serial peripheral interface and a data transmitting method thereof, in which many control pins of the serial peripheral interface are utilized to achieve a serial data transmission through multiple input pins and multiple output pins, and enhance the overall behavior of data transmission.

According to a first aspect of the present invention, A serial peripheral interface of an integrated circuit including multiple pins and a clock pin is provided. The pins are coupled to the integrated circuit for transmitting an instruction, an address or a read out data. The clock pin is coupled to the integrated circuit for inputting multiple timing pulses. The plurality of pins transmit the instruction, the address or the read out data at rising edges, falling edges or both edges of the timing pulses.

According to a second aspect of the present invention, a data transmitting method applied to a serial peripheral interface of an integrated circuit is provided. The serial peripheral interface includes many pins and a clock pin. The data transmitting method includes the steps of: inputting a plurality of timing pulses by the clock pin; and transmitting an instruction, an address or a read out data by the plurality of pins at rising edges, falling edges or both edges of the timing pulses.

The invention will become apparent from the following detailed description of the preferred but non-limiting embodiments. The following description is made with reference to the accompanying drawings.

BRIEF DESCRIPTION OF THE DRAWINGS

FIG. 3 is a block diagram showing an example of a data transmission system according to a preferred embodiment of the invention.

DETAILED DESCRIPTION OF THE INVENTION

Figure 1:
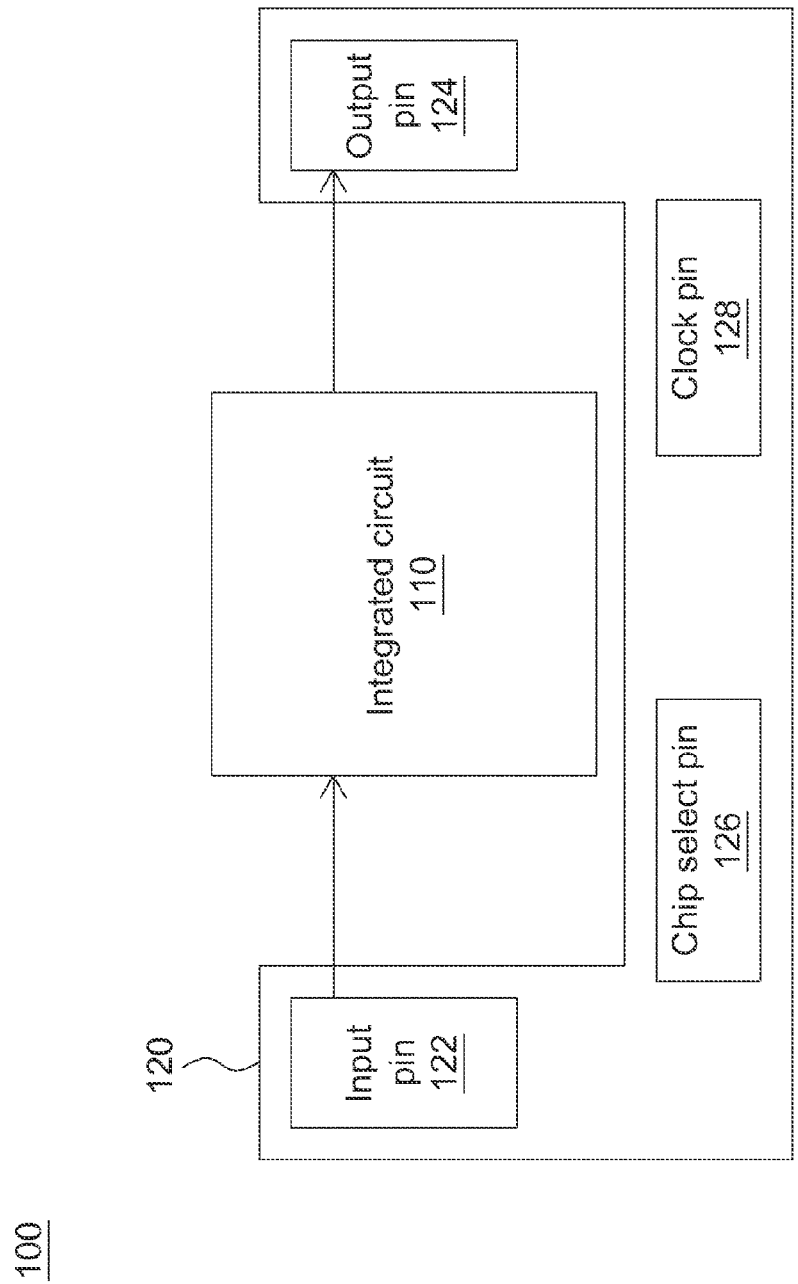
FIG. 1 (Prior Art) is a block diagram showing a conventional data transmission system.
Figure 2:
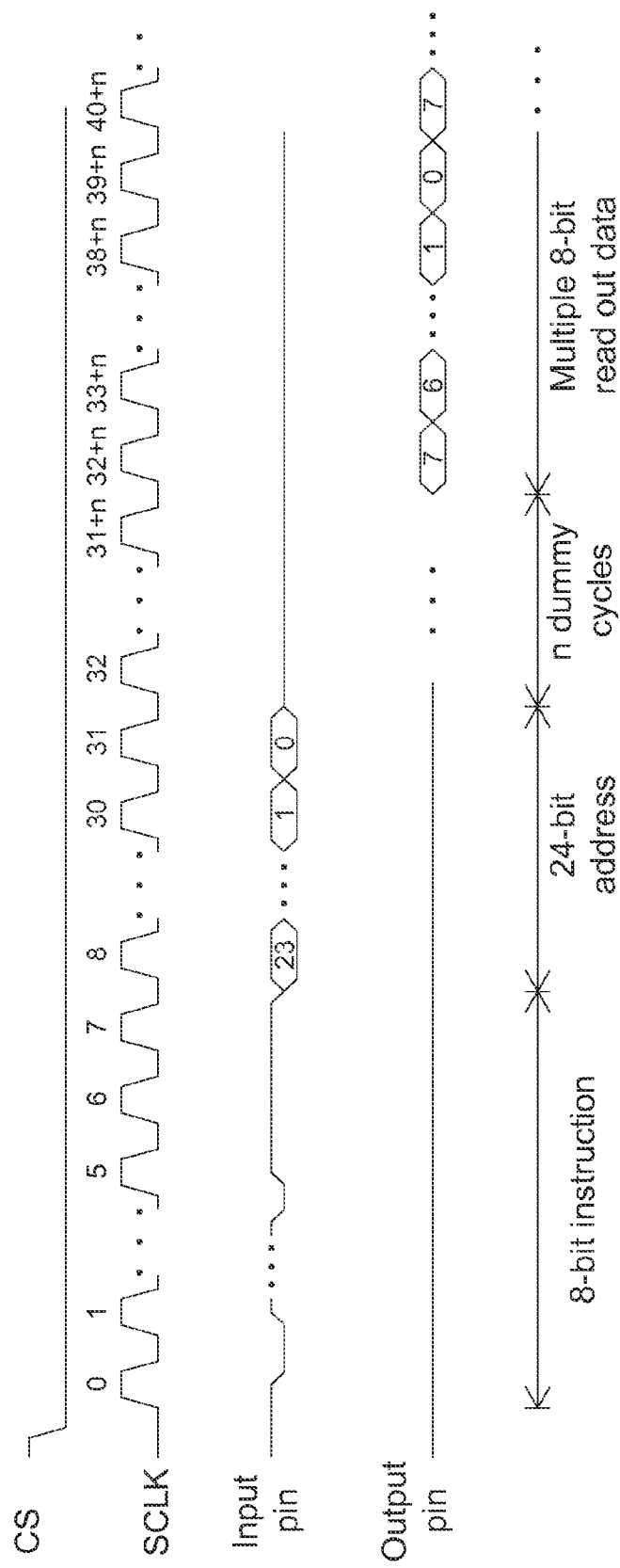
FIG. 2 (Prior Art) shows timings for reading serial data in the conventional data transmission system.

The invention provides a serial peripheral interface and a data transmitting method thereof, in which many control pins of the serial peripheral interface are utilized to achieve the serial data transmission through multiple input pins and multiple output pins, and enhance the overall behavior of data transmission.

FIG. 3 is a block diagram showing an example of a data transmission system 300 according to a preferred embodiment of the invention. Referring to FIG. 3, the data transmission system 300 includes an integrated circuit 310 and a serial peripheral interface 320. Take the integrated circuit 310 be a memory device as exemplified, but is not limited. The integrated circuit 310 may be any circuit having a function of storing data. When the integrated circuit 310 is the memory device, the integrated circuit 310 includes a data register 312, a memory cell array 314 and an output buffer 316. The memory cell array 314 stores data.

The serial peripheral interface 320 has many pins 321 to 324 which are coupled to the integrated circuit 310. The integrated circuit 300 receives an instruction using only the first pin 321 or the first pin 321, the second pin 322, the third pin 323, and the fourth pin 324 of the serial peripheral interface 320. The integrated circuit receives 300 an address using the first pin 321, the second pin 322, the third pin 323, and the fourth pin 324 of the serial peripheral interface 320. The instruction and the address are transmitted to the data register 312, temporarily stored in the data register 312, and then transmitted to the memory cell array 314.

When a read out data is read from the integrated circuit 310 (i.e., when the read out data is to be read from the memory cell array 314), the read out data is transmitted to the output buffer 316 from the memory cell array 314, and temporarily stored in the output buffer 316. Then the read out data is sent through the first pin 321, the second pin 322, the third pin 323, and the fourth pin 324 of the serial peripheral interface 320. There may exist multiple dummy cycles before the read out data is sent.

The multiple pins of the serial peripheral interface 320 substantially include the first pin 321 and the second pin 322. When the first pin 321 is not for transmitting the instruction, the address or the read out data, the first pin 321 is used to temporarily stop transmitting the read out data. When the second pin 322 is not for transmitting the instruction, the address or the read out data, the second pin 322 can prevent the read out data from being read from the memory cell array 314. The first pin 321 and the second pin 322 substantially pertain to the control pins in the conventional serial peripheral interface, and are utilized to achieve the transmission of a piece of serial data, including instructions, addresses, dummy cycles and multiple read out data, through multiple input pins and multiple output pins in this embodiment.

The serial peripheral interface 320 further includes a chip select pin 325 for outputting a chip select signal CS. When the voltage level of the chip select signal CS is low, the first pin 321 to the fourth pin 324 transmit the instruction, the address or the read out data. In addition, the serial peripheral interface 320 also includes a clock pin 326 for inputting a timing signal SCLK, and the first pin 321 to the fourth pin 324 transmit the instruction, the address or the read out data according to the timing signal. It is possible to utilize the first pin 321 to the fourth pin 324 to simultaneously transmit the instruction, the address or the read out data, or to utilize some of the first pin 321 to the fourth pin 324 to simultaneously transmit the instruction, the address or the read out data. Compared with the conventional serial peripheral interface, the serial peripheral interface 300 according to the embodiment of the invention can increase the overall data transmission rate at most three times.

The timing signal SCLK includes many timing pulses. The first pin 321 to the fourth pin 324 transmit data according to the timing pulses. In addition, the first pin 321 to the fourth pin 324 may also transmit the data at rising edges, falling edges or both of the timing pulses. That is, a selection of the function of the double data rate (DDR) is provided.

Figure 4A:
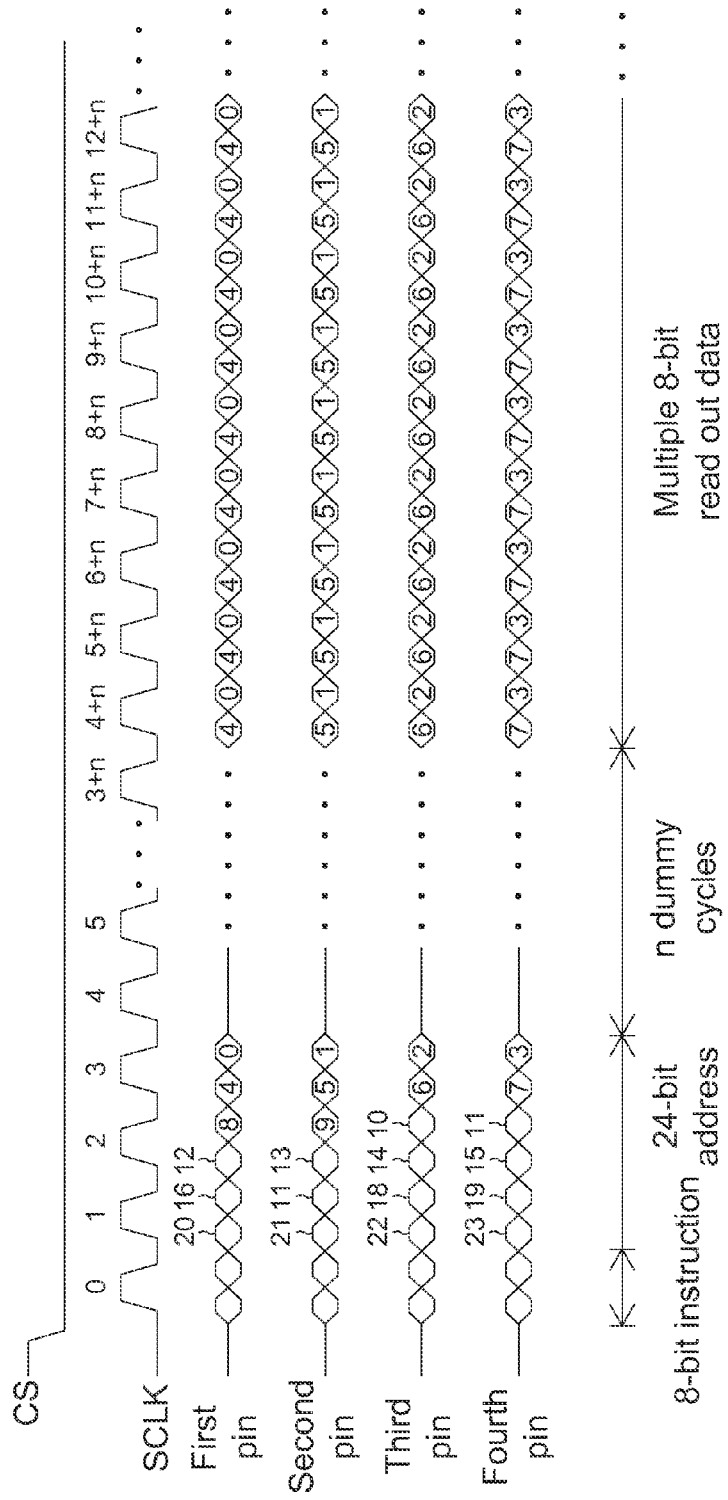
FIG. 4A shows timings of serial data according to a first embodiment of the invention.

FIG. 4A shows timings of serial data according to a first embodiment of the invention. As shown in FIG. 4A, for example, the serial data includes an 8-bit instruction, a 24-bit address, n dummy cycles and multiple 8-bit read out data, wherein n is an integer greater than or equal to 0 and is not particularly restricted. In FIG. 4A, when the chip select signal CS is low, the timing signal SCLK has many timing pulses. The first pin 321 to the fourth pin 324 receive the serial data at the rising edges and the falling edges of the timing pulses.

The first pin 321 to the fourth pin 324 receive the 8-bit instruction at the timing pulse 0, and then receive the 24-bit address at the timing pulses 1 to 3, wherein this address is the initial address of the data to be read. Then, n dummy cycles are provided for buffering. Next, the multiple 8-bit read out data are read and outputted after the timing pulse n+3. Compared with the conventional serial peripheral interface, the data transmission rate of the first embodiment of the invention may be increased seven times. In FIG. 4A, the transmission of all of the instruction, the address, the dummy cycles and the read out data is made according to the function of the double data rate. However, the transmission of the instruction, the address, the dummy cycles or the read out data may be also individually made according to the function of the double data rate or not. For example, only the transmission of the read out data is made according to, without limitation to, the function of the double data rate.

Figure 4B:
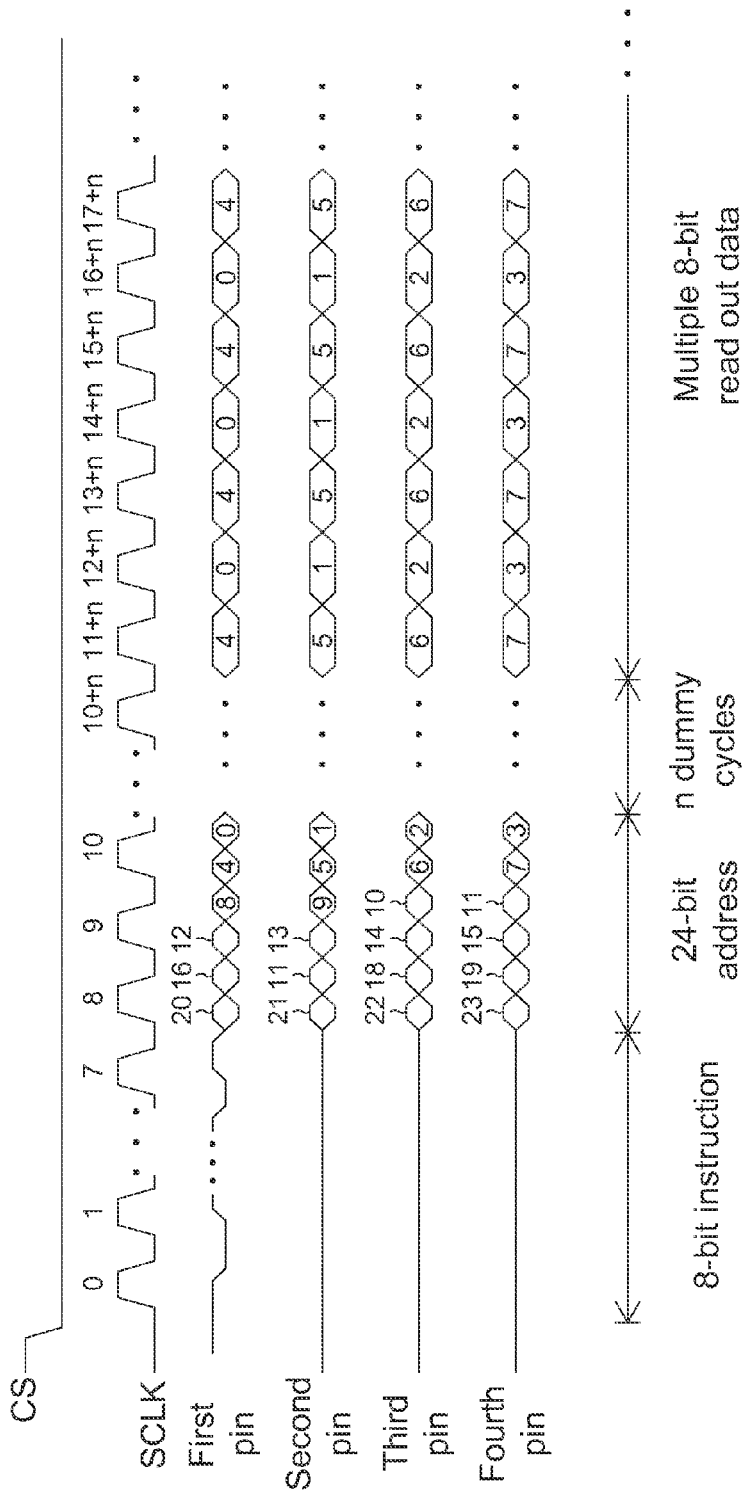
FIG. 4B shows timings of serial data according to a second embodiment of the invention.

FIG. 4B shows timings of serial data according to a second embodiment of the invention. As shown in FIG. 4B, the first pin 321 receives the 8-bit instruction at the timing pulse 0 to 7. Then the first pin 321 to the fourth pin 324 receive the 24-bit address at the timing pulses 8 to 10. Then, n dummy cycles are provided for buffering. Next, the multiple 8-bit read out data are read and outputted after the timing pulse n+10. The 8-bit instruction is received only by the first pin 321. The 24-bit address is received by the function of double data rate. The multiple 8-bit read out data are received without the function of double data rate. In the invention, whether the transmission of the instruction, the address, the dummy cycles or the read out data applies the function of double data rate is decided according to the practical requirement and not limited hereinabove.

Figure 5:
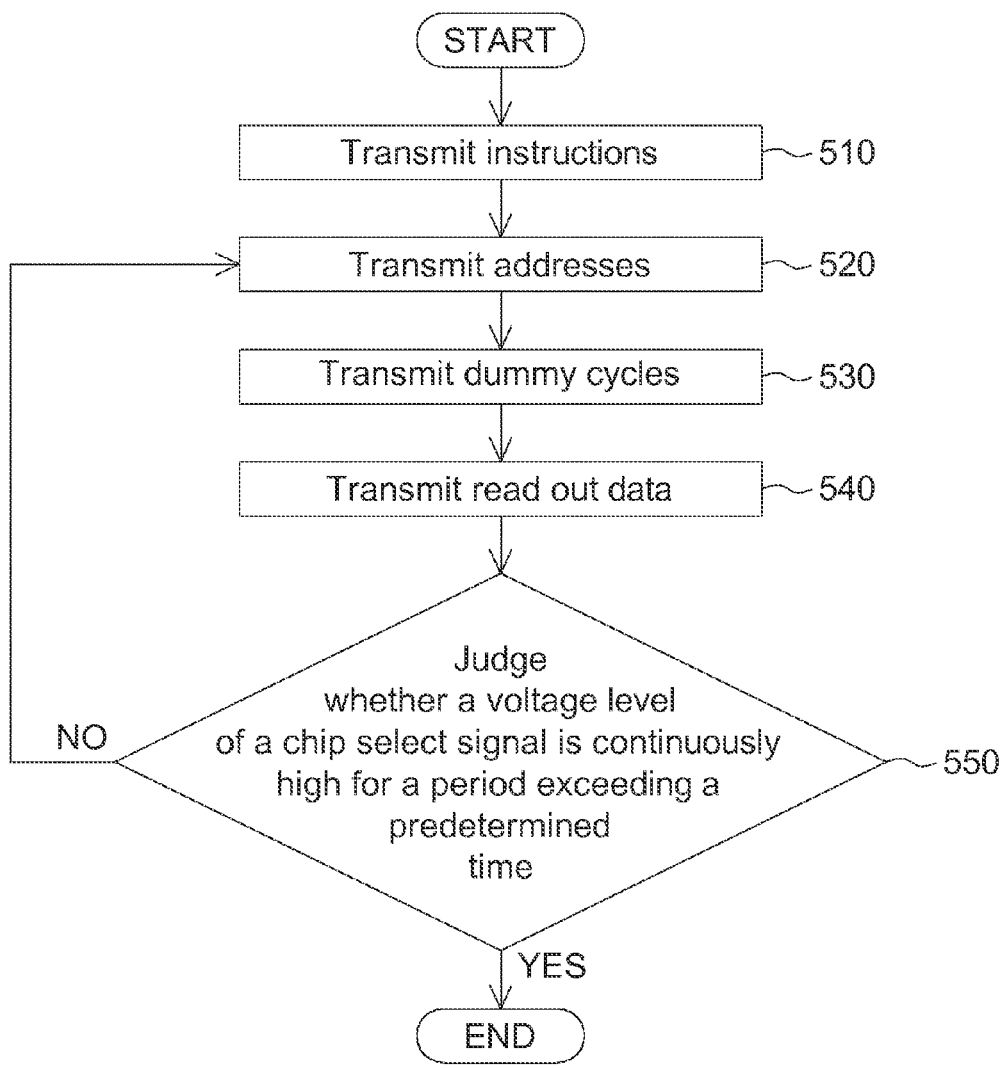
FIG. 5 is a flow chart showing a method for transmitting random data according to the preferred embodiment of the invention.

The data transmitting method mentioned hereinabove is performed to transmit the continuous data. If the random data has to be transmitted, it is necessary to make a judgement according to the time, for which the voltage level of the chip select signal CS is kept high. FIG. 5 is a flow chart showing a method for transmitting random data according to the preferred embodiment of the invention. First, the instruction, the address, the dummy cycles and the read out data are sequentially transmitted in steps 510 to 540. Then, step 550 judges whether the voltage level of the chip select signal is continuously kept high for a period exceeding a predetermined time, such as 240 nanoseconds (ns). If the voltage level of the chip select signal is continuously kept high for a period not exceeding the predetermined time, it represents that the instruction is a random access instruction. So, the procedure goes back to step 520, and the address, the dummy cycles and the read out data are transmitted again. If the voltage level of the chip select signal is continuously kept high for a period exceeding the predetermined time, it represents that the data transmission ends.

The serial peripheral interface and the data transmitting method according to the embodiment of the invention utilize many control pins on the serial peripheral interface to perform the data transmitting operation with the integrated circuit. The integrated circuit may be any type circuit with the function of data storage. Consequently, the serial data transmission can be through the multiple input pins and the multiple output pins, and the overall performance of data transmission can be enhanced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A serial peripheral interface of an integrated circuit, the serial peripheral interface comprising:
   a first transfer pin for receiving an instruction and an address;
   a clock pin for inputting a plurality of timing pulses each having a rising edge and a falling edge; and
   a second transfer pin for preventing data from being read from the integrated circuit, and transmitting the instruction, the address or the data when the second transfer pin is not for preventing the data from being read from the integrated circuit;

wherein after the first transfer pin receives the instruction, the integrated circuit receives the address through the first transfer pin in continuity with the receipt of the instruction; and the first transfer pin receives the instruction at either of the rising edges and the falling edges of the timing pulses and receives the address at both of the rising edges and falling edges of the timing pulses.

2. The serial peripheral interface according to claim 1, wherein the integrated circuit receives the instruction under a control of selectively using only the first transfer pin or a combination of the first transfer pin, the second transfer pin, a third transfer pin, and a fourth transfer pin of the serial peripheral interface, the integrated circuit receives the address using the first transfer pin, the second transfer pin, the third transfer pin, and the fourth transfer pin of the serial peripheral interface, and the integrated circuit transmits a data using the first transfer pin, the second transfer pin, the third transfer pin, and the fourth transfer pin of the serial peripheral interface.

3. The serial peripheral interface according to claim 2, wherein
the first transfer pin is for temporarily stopping transmitting the data, and transmitting the instruction, the address or the data when the first transfer pin is not for temporarily stopping transmitting the data.

4. The serial peripheral interface according to claim 3, wherein the integrated circuit is a memory device which comprises:
a memory cell array for storing the data;
a data register, wherein the instruction and the address are transmitted to the data register through at least part of the pins and temporarily stored in the data register, and then transmitted to the memory cell array; and
an output buffer, wherein the data is transmitted from the memory cell array to the output buffer and temporarily stored in the output buffer, and then transmitted to at least part of the pins, and the serial peripheral interface outputs the data.

5. The serial peripheral interface according to claim 4, wherein both of the first transfer pin and the second transfer pin are coupled to the data register and the output buffer.

6. The serial peripheral interface according to claim 1, wherein the integrated circuit receives the address through the first transfer pin and other transfer pin/pins in continuity with the receipt of the instruction.

7. The serial peripheral interface according to claim 1, wherein the transmission of the address at both of the rising and falling edges of the timing pulses is initiated by the instruction.

8. The serial peripheral interface according to claim 1, wherein the second transfer pin is for transmitting a data associated with the address at both of the rising and falling edges of the timing pulses.

9. The serial peripheral interface according to claim 1, the first transfer pin also transmits a data associated with the address at both of the rising and falling edges of the timing pulses in a multiple mode.

10. A data transmitting method applied to a serial peripheral interface of an integrated circuit, the serial peripheral interface including a plurality of pins and a clock pin, the method comprising the steps of:
inputting a plurality of timing pulses by the clock pin;
transmitting an instruction and transmitting an address by a first transfer pin of the plurality of pins, wherein the instruction is transmitted at either of rising edges and falling edges of the timing pulses and the address is transmitted at both of the rising edges or the falling edges of the timing pulses; and
preventing data from being read from the integrated circuit through a second transfer pin of the plurality of pins when the second transfer pin is not for transmitting the instruction, the address or the data.

11. The method according to claim 10, further comprising the steps of:
transmitting the instruction under a control of selectively using only the first transfer pin or a combination of the first transfer pin, the second transfer pin, a third transfer pin, and a fourth transfer pin of the serial peripheral interface;
transmitting the address using the first transfer pin, the second transfer pin, the third transfer pin, and the fourth transfer pin of the serial peripheral interface; and
sending data using the first transfer pin, the second transfer pin, the third transfer pin, and the fourth transfer pin of the serial peripheral interface.

12. The method according to claim 11, wherein the integrated circuit is a memory device, and the memory device comprises a memory cell array, a data register and an output buffer, and the method further comprises the steps of:
transmitting the instruction and the address to the data register through at least part of the pins and temporarily storing the instruction and the address in the data register, and then transmitting the instruction and the address to the memory cell array when the instruction and the address is received by the integrated circuit; and
transmitting the data from the memory cell array to the output buffer, and temporarily storing the data into the output buffer, then transmitting the data to at least part of the pins, and outputting the data through the serial peripheral interface when the data is read from the integrated circuit;
wherein both of the first transfer pin and the second transfer pin are coupled to the data register and the output buffer.

13. The method according to claim 12, further comprising a step of:
inputting a chip select signal by a chip select pin, and transmitting the instruction, the address or the data through at least part of the pins when a voltage level of the chip select signal is low.

14. The method according to claim 13, wherein when the data is read from the integrated circuit and if the voltage level of the chip select signal is continuously high for a period not exceeding a predetermined time, the pins transmit a new address, a new dummy cycle and a new data.

15. The method according to claim 14, further comprising the step of:
stopping reading the data from the memory device if the voltage level of the chip select signal is continuously high for another period exceeding the predetermined time.

16. The method according to claim 10, wherein
the integrated circuit transmits the address through the first transfer pin and other transfer pin/pins in continuity with transmission of the instruction.

17. The method according to claim 10, further comprising the steps of: transmitting a data associated with the address by the second transfer pin at both of the rising and falling edges of the timing pulses.

18. The method according to claim 10, further comprising transmitting a data associated with the address by the first transfer pin at both of the rising and falling edges of the timing pulses in a multiple mode.

19. The method according to claim 10, wherein the step of transmitting the address or a data both at rising and falling edges of the timing pulses is initiated by the instruction.

20. The method according to claim 10, further comprising the steps of:
- temporarily stopping transmitting a data through the first transfer pin when the first transfer pin is not for transmitting the instruction, the address or the data.

* * * * *